Patented Mar. 11, 1952

2,588,679

UNITED STATES PATENT OFFICE 2,588,679

PURIFICATION OF GENTISIC ACID

Bill M. Williams, Luther F. Berhenke, and Floyd L. Beman, Midland, Mich., assignors to The Dow Chemical Company, Midland, Mich., a corporation of Delaware No Drawing. Application August 17, 1950, Serial No. 180,102

9 Claims. (Cl. 260—525)

This invention relates to the production of gentisic acid, and, more particularly, to a method for separating gentisic acid from impurities formed during the preparation thereof.

Crude gentisic acid, i. e. 5-hydroxy salicylic acid, has been known for many years, but its pure form was unknown until quite recently (cf. J. Am. Chem. Soc., 71, p. 2056 (1949)). Gentisic acid was known in its impure form because of separation difficulties encountered in all preparations thereof; for example, the best method known to us for producing the acid (i. e., by hydrolyzing an aqueous solution of a 5-halosalicylic acid) yields a mixture of salicylic acid, the 5-halosalicylic acid, and gentisic acid. The production of gentisic acid by hydrolysis of an aqueous solution of a 5-halosalicylic acid has usually been carried out in an aqueous alkali metal hydroxide solution thereof; before our invention, gentisic acid, together with most of the salicylic acid (which is formed during the course of the hydrolysis, and is usually present as an impurity in the 5-halosalicylic acid starting material) and unreacted 5-halosalicylic acid, was recovered from the aqueous hydrolysis solution, e. g., by ether extraction, and partially purified by recrystallization. The complete separation of salicylic acid and the 5-halosalicylic acid from gentisic acid was not known to be possible prior to our invention. For example, efforts have been made to effect the separation by recrystallization of the acids and also of their sodium salts. Sublimation has been tried as a possible way of carrying out the separation. Attempts have been made to carry out a selective decomposition that would eliminate the salicylic acid and the 5-halosalicylic acid and leave the gentisic. The acids have been acetylated and separation of the acetates by recrystallization tried. None of the aforementioned attempts to separate the acids was successful. Equally fruitless were efforts to use a selective solvent to extract salicylic acid and a 5-halosalicylic acid from a mixture of crystals consisting essentially of salicylic acid, a 5-halosalicylic acid, and gentisic acid.

The present invention is based upon the discovery that essentially pure gentisic acid can be produced by hydrolyzing a 5-halosalicylic acid in the known way, acidifying the resulting hydrolysis products, extracting salicylic acid and the unreacted 5-halosalicylic acid from the acidified hydrolysis products, and then extracting the latter from the aqueous raffinate and purifying.

According to the invention, an aqueous solution of a 5-halosalicylic acid is hydrolyzed to gentisic acid; the hydrolysis products are acidified, and essentially all of the salicylic acid and the 5-halosalicylic acid present in the hydrolysis products are extracted therefrom by a selective solvent, preferably as the next step after hydrolysis; most of the gentisic acid remains in the aqueous solution after this extraction, and is removed therefrom by a water immiscible solvent; the solvent is evaporated, leaving the gentisic acid; and the gentisic acid is finally purified by recrystallization. 5-bromo, 5-chloro-, and 5-iodo-salicylic acids are the preferred starting materials, although 5-fluoro-salicylic acid can also be used. Solvents that can be used to extract the salicylic acid and the 5-halosalicylic acid from the hydrolysis products are the liquid polychloroalkanes containing one or two carbon atoms per molecule, such as chloroform, carbon tetrachloride, trichloroethanes, dichloroethanes, methylene dichloride, tetrachloroethanes, and pentachloroethanes. The first three solvents named are preferred, and 1,1,1-trichloroethane is the preferred trichloroethane. After extraction of the salicylic acid and 5-halosalicylic acid, gentisic acid is conveniently separated from the aqueous raffinate by extraction with a water immiscible solvent, such as benzene, diethyl ether, a ketone, or the like; the solvent is then distilled from the gentisic acid extract, and the gentisic acid which remans after distillation is purified by recrystallization from aqueous solution. Gentisic acid so purified is essentially free of other materials, and is suitable for use as a pharmaceutical effective in the treatment of arthritis. Its melting point is from 205° C. to 206° C. as contrasted with the reported melting point of less than 200° C. for gentisic acid produced by a similar method but without the extraction of the invention.

As has been indicated, the extraction of salicylic acid and of the 5-halosalicylic acid by the polychloroalkane should be substantially complete. Small quantities of these materials are soluble in water, and are, therefore, separated from the gentisic acid during the final purification of the latter by recrystallization. However, unreasonably large amounts of water are required for the recrystallization if substantial amounts of salicylic acid and of the 5-halosalicylic acid are present.

The extraction of salicylic acid and a 5-halosalicylic acid from the hydrolysis products is conveniently carried out at a temperature between about 0° C. and about 50° C., preferably 10° to 30° C. It is usually preferred that the volume ratio of total solvent used to hydrolysis products be at least 1:2, but not greater than 10:1. The number of extractions employed, and the amount of solvent used per extraction is a matter of choice, or may be determined by the limitations of available equipment adapted to the practice of the invention.

Although the present invention has been described with respect to the purification of the products of the hydrolysis of a 5-halosalicylic acid, it is to be understood that the extraction of the invention is equally applicable to the production of pure gentisic acid from any aqueous solution comprising, as essentially the only organic solutes, salicylic acid, a 5-halosalicylic acid and gentisic acid.

A preferred method for the production of pure gentisic acid from a 5-halosalicylic acid by a method that includes the step of the invention is illustrated in the following examples, which are to be construed as illustrative rather than limitative:

EXAMPLE 1

To a solution of 200 grams of sodium hydroxide in 1600 cc. of water there were added 28 grams of cuprous oxide and 217 grams of 5-bromosalicylic acid. The resulting mixture was then heated under gentle reflux for 24 hours to cause hydrolysis of the 5-bromosalicylic acid to gentisic acid. During hydrolysis the reaction mixture was blanketed with methane to prevent oxidation by air. At the end of the heating period, the reaction mixture was cooled to room temperature and $Cu_2O$ was separated therefrom by filtration. The filtrate was added to an aqueous hydrochloric acid solution produced by diluting 350 cc. of concentrated hydrochloric acid to 5000 cc. with water; the resulting solution was diluted to 10,000 cc. (at 24° C.) with water and filtered to remove a small amount of a solid material present. The filtrate was extracted (at room temperature) five times with 3,300 cc. portions of chloroform. The remaining aqueous solution was then extracted with four 2,000 cc. portions of methyl isobutyl ketone. The fourth extraction was run merely to check completeness of the first three extractions, and was found to leave only 0.8 gram of a tarry residue upon evaporation to dryness. The other three methyl isobutyl ketone extracts were combined, and the solvent was distilled therefrom at a pressure of about 120 mm. Hg. The residue from the distillation, consisting of solid gentisic acid, was dried and dissolved in 710 cc. of boiling water. Decolorizing carbon (12.5 grams) was added to this solution to eliminate colored materials and was separated therefrom by filtration. The solution was cooled, and cream colored crystals which precipitated were filtered therefrom and dried at about 110° C. The material recovered amounted to 102.3 grams, and was estimated by titration to be 99.3 per cent gentisic acid; its melting point was 205° C. to 206° C. Further gentisic acid was recovered by reworking the mother liquors so that the total recovery thereof amounted to 72.3 per cent of theory.

EXAMPLE 2

The suitability of other liquid polychloroalkane solvents as substitutes for chloroform was demonstrated by measuring their effectiveness at extracting both gentisic acid and salicylic acid from standard aqueous solutions. The per cent of each acid which was removed by one extraction with each solvent was ascertained. For any solvent, the ratio of the per cent of salicylic acid extracted to the per cent of gentisic acid extracted is a measure of the selectivity of that solvent for salicylic acid over gentisic acid. The higher this ratio, other things being equal, the more effective is that solvent for the method of the invention. The table, below, shows the per cent of gentisic acid removed by one standard extraction as described above, the per cent of salicylic acid removed by one standard extraction, and the ratio of per cent of salicylic acid removed to per cent of gentisic acid removed.

Table

| Solvent | Per cent Gentisic acid removed by one extraction | Per cent Salicylic acid removed by one extraction | Ratio: per cent Salicylic acid removed to per cent gentisic acid removed |
|---|---|---|---|
| Methylene Dichloride | 3.71 | 76.6 | 20.6 |
| Chloroform | 3.09 | 71.9 | 23.3 |
| Carbon Tetrachloride | 0.62 | 45.3 | 73.0 |
| Ethylene Dichloride | 4.32 | 76.6 | 17.7 |
| 1,1,1-Trichloroethane | 1.24 | 57.8 | 46.6 |
| 1,1,2,2-Tetrachloroethane | 2.47 | 73.4 | 29.7 |

The data recorded in the table show the operability of other liquid polychloroalkanes containing one or two carbon atoms per molecule as substitutes for the chloroform used in Example 1 for the process of the invention.

We claim:

1. A method of recovering substantially pure gentisic acid from an aqueous solution comprising, as essentially the only organic solutes, salicylic acid, a 5-halosalicylic acid, and gentisic acid, which comprises extracting the aqueous solution with a liquid polychloroalkane containing from one to two carbon atoms per molecule until essentially all the salicylic acid and 5-halosalicylic acid have been removed from the aqueous phase, extracting the resulting raffinate with a water-immiscible solvent for gentisic acid to withdraw substantially all the gentisic acid from such raffinate, and removing the solvent from the resulting water-immiscible extract to recover gentisic acid in purified form.

2. A method as claimed in claim 1 in which the solvent is chloroform.

3. A method as claimed in claim 1 in which the solvent is carbon tetrachloride.

4. A method as claimed in claim 1 in which the solvent is 1,1,1-trichloroethane.

5. In a method of recovering substantially pure gentisic acid from the acidified product of the aqueous hydrolysis of a 5-halosalicylic acid, the steps which comprise extracting the acidified aqueous hydrolyzate at a temperature of 0° to 50° C. with a liquid polychloroalkane containing from one to two carbon atoms per molecule to remove essentially all the salicylic acid and 5-halosalicylic acid present therein, extracting the resulting raffinate with a water-immiscible solvent for gentisic acid to withdraw substantially all the gentisic acid from such raffinate, distilling the solvent from the resulting water-immiscible extract to leave nearly pure gentisic acid, and further purifying the latter by recrystallization from water solution.

6. The invention as claimed in claim 5 in which the solvent is chloroform.

7. The invention according to claim 5 wherein the water-immiscible solvent for gentisic acid is methyl isobutyl ketone.

8. The invention as claimed in claim 5 in which the solvent is carbon tetrachloride.

9. The invention as claimed in claim 5 in which the solvent is 1,1,1-trichloroethane.

BILL M. WILLIAMS.
LUTHER F. BERHENKE.
FLOYD L. BEMAN.

REFERENCES CITED

The following references are of record in the file of this patent:

UNITED STATES PATENTS

| Number | Name | Date |
|---|---|---|
| 2,502,870 | Martin | Apr. 4, 1950 |

OTHER REFERENCES

Lautermann: Liebig's Ann. vol. 120, pp. 311–316 (1861).

Liechti: Liebig's Ann., suppl. vol. 7, pp. 144–145 (1870).

Demole: Ber. Deut. Chem., vol. 7, pp. 1437–1438 (1874).

Rakowski et al.: Ber. Deut. Chem., vol. 8, p. 789 (1875).

Miller: Liebig's Ann., vol. 220, pp. 124–125 (1883).

Smith: J. Phys. Chem., vol. 25, pp. 229–230 (1921).

Heilbron: "Dict. of Org. Compounds," vol. I, p. 530 (1943).